(12) United States Patent
Kurita et al.

(10) Patent No.: US 11,733,942 B2
(45) Date of Patent: Aug. 22, 2023

(54) IMAGE FORMING APPARATUS COMPRISING AN OPERATING PORTION, AN INPUT DEVICE, AND AN IC CARD READER THAT IS DISPOSED BEYOND A RIGHT SIDE WALL OF AN OUTER CASING FRAME

(71) Applicant: CANON KABUSHIKI KAISHA, Tokyo (JP)

(72) Inventors: Shigeharu Kurita, Abiko (JP); Shingo Hattori, Abiko (JP); Hirohisa Sawada, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/781,018

(22) Filed: Feb. 4, 2020

(65) Prior Publication Data
US 2020/0249888 A1 Aug. 6, 2020

(30) Foreign Application Priority Data
Feb. 5, 2019 (JP) .................... 2019-018380

(51) Int. Cl.
*H04N 1/00* (2006.01)
*G06F 3/12* (2006.01)
*H04N 1/34* (2006.01)

(52) U.S. Cl.
CPC ....... *G06F 3/1238* (2013.01); *H04N 1/00411* (2013.01); *H04N 1/34* (2013.01)

(58) Field of Classification Search
CPC .... H04N 1/00411; H04N 1/34; H04N 1/4406; H04N 1/4426; G06F 3/1238
(Continued)

(56) References Cited

U.S. PATENT DOCUMENTS 5,293,256 A * 3/1994 Fukushima ........ H04N 1/32058
358/401
6,085,974 A * 7/2000 Inoue .................... G06K 7/0013
235/472.01
(Continued)

FOREIGN PATENT DOCUMENTS

CN 102236426 A 11/2011
CN 105590376 B * 11/2018
(Continued)

OTHER PUBLICATIONS

Nov. 1, 2022 Office Action in Japanese Patent Application No. 2019-018380.

*Primary Examiner* — Chad Dickerson
(74) *Attorney, Agent, or Firm* — Venable LLP

(57) ABSTRACT

An image forming apparatus includes an operating portion which is capable of displaying a software key and which is not provided with a hardware key; an input device which is a separate member from the operating portion, which is provided adjacent to a right side of the operating portion when the image forming apparatus is seen from a position opposing the operating portion, and which is provided with a hardware key; an IC card reader which is a separate member from the operating portion and the input device, which is provided adjacent to a right side of the input device when the image forming apparatus is seen from a position opposing the input device, and which is configured to receive user information from an IC card; and a holding member configured to integrally hold the input device and the IC reader.

3 Claims, 14 Drawing Sheets

(58) Field of Classification Search
USPC .............................................. 358/1.11–1.18
See application file for complete search history.

(56) References Cited

U.S. PATENT DOCUMENTS

| | | | |
|---|---|---|---|
| 6,115,034 A | 9/2000 | Tanaka et al. | |
| 11,509,783 B2* | 11/2022 | Toda | H04N 1/00493 |
| 2008/0231887 A1* | 9/2008 | Sakagami | H04N 1/4433 |
| | | | 358/1.15 |
| 2009/0007232 A1* | 1/2009 | Kasatani | H04L 63/0853 |
| | | | 726/2 |
| 2010/0332703 A1 | 12/2010 | Ejiri | |
| 2011/0128247 A1* | 6/2011 | Sensu | G06F 3/0227 |
| | | | 345/173 |
| 2011/0181903 A1* | 7/2011 | Katsuyama | H04N 1/0035 |
| | | | 358/1.14 |
| 2012/0080948 A1* | 4/2012 | Akazawa | H02J 1/10 |
| | | | 307/31 |
| 2012/0243042 A1* | 9/2012 | Uchida | G03G 15/5016 |
| | | | 358/1.15 |
| 2014/0327926 A1* | 11/2014 | Katsuyama | H04N 1/00564 |
| | | | 358/1.14 |
| 2016/0094740 A1 | 3/2016 | Sunohara | |
| 2017/0026530 A1* | 1/2017 | Sawada | H04N 1/00307 |
| 2017/0374213 A1 | 12/2017 | Sawada | |
| 2018/0077307 A1 | 3/2018 | Sawada | |
| 2020/0110308 A1 | 4/2020 | Hattori et al. | |
| 2020/0153985 A1 | 5/2020 | Sawada | |

FOREIGN PATENT DOCUMENTS

| | | |
|---|---|---|
| JP | 2011-154075 A | 8/2011 |
| JP | 2011-203371 A | 10/2011 |
| JP | 2016-064614 A | 4/2016 |
| JP | 2017-177406 A | 10/2017 |
| JP | 2018-046499 A | 3/2018 |

* cited by examiner

IMAGE FORMING APPARATUS COMPRISING AN OPERATING PORTION, AN INPUT DEVICE, AND AN IC CARD READER THAT IS DISPOSED BEYOND A RIGHT SIDE WALL OF AN OUTER CASING FRAME

FIELD OF THE INVENTION AND RELATED ART

The present invention relates to an image forming apparatus such as an electrophotographic copying machine or an electrophotographic printer (for example, a laser beam printer, an LED printer or the like).

In the image forming apparatus, a constitution in which an IC card reader for reading IC card information of a user and for authenticating individuals has been known. Further, in Japanese Laid-Open Patent Application (JP-A) 2011-154075, a constitution in which a numeric keypad as hardware keys is arranged on the side of an operating portion for not only displaying information but also making setting as to image formation and in which the IC card reader is arranged adjacent to the side of the numeric keypad is disclosed. Information inputted to the numeric keypad is displayed on the operating portion, and the user operates the operating portion while inputting numerical value information through the numeric keypad and thus makes the setting as the image formation.

In recent years, similarly as mobile devices such as smartphones, which become widespread, also as regards the image forming apparatus, those on which an operating portion of a touch panel type is mounted are beginning to spread. In the operating portion of the touch panel type, keys permitting input of numerical values on an operation screen thereof are displayed, and by touching the keys, input of the numerical values can be carried out. Thus, in the image forming apparatus on which the operating portion of the touch panel type is mounted, the keys can be displayed on a display screen, and therefore, the numeric keypad as the hardware keys of a conventional type is not provided.

However, users who are unaccustomed to operating the touch panel and users who like operation feeling also exist. Such users request for addition, as an option, of a numeric keypad device (input device) provided with the numeric keypad as the hardware keys of the conventional type. In order to meet the request, manufactures provide, as an option, numeric keypad devices to the users. In this regard, as disclosed in JP-A 2011-154075, when the IC card reader is arranged adjacent to the right side of the operating portion, the following problem arises at the time of additionally providing the numeric keypad device.

That is, from the viewpoint of user's operability, it is preferable that the numeric keypad device is arranged adjacent to the right side of the operating portion of the touch panel type. However, in the constitution of JP-A 2011-154075, the IC card reader is arranged adjacent to the right side of the operating portion, and therefore, the numeric keypad device is necessarily arranged on a further right side of the IC card reader. In this case, a distance between the operating portion of the touch panel type and the numeric keypad device is increased, so that it becomes difficult for the users to input numerical values through the numeric keypad device.

SUMMARY OF THE INVENTION

The present invention has been accomplished in view of the above-described circumstances. A principal object of the present invention is to provide an image forming apparatus in which a lowering in operability of a numeric keypad device mounted as an option is suppressed.

According to an aspect of the present invention is to provide an image forming apparatus comprising: an operating portion of a touch panel type, which is capable of displaying a software key permitting input of a numerical value and which is not provided with a hardware key permitting input of the numerical value; an input device which is a separate member from the operating portion, which is provided adjacent to a right side of the operating portion when the image forming apparatus is seen from a position opposing the operating portion, and which is provided with a hardware key permitting input of the numerical value; an IC card reader which is a separate member from the operating portion and the input device, which is provided adjacent to a right side of the input device when the image forming apparatus is seen from a position opposing the input device, and which is configured to receive user information from an IC card; and a holding member configured to integrally hold the input device and the IC reader.

Further features of the present invention will become apparent from the following description of exemplary embodiments with reference to the attached to drawings.

DESCRIPTION OF EMBODIMENTS

First Embodiment

<Image Forming Apparatus>

In the following, first, a general structure of an image forming apparatus according to a first embodiment of the present invention will be described together with an operation during image formation with reference to the drawings. Incidentally, as regards dimensions, materials, shapes and relative arrangement of constituent elements described in the following embodiments, the scope of the present invention is not intended to be limited thereto unless otherwise specified.

An image forming apparatus A according to this embodiment is an image forming apparatus of an intermediary tandem type in which toner images of four colors of yellow Y, magenta M, cyan C and black K are transferred onto an intermediary transfer belt and thereafter are transferred onto a sheet and thus an image is formed. In the following description, although suffixes Y, M, C and K are added to members using respective color toners, constitutions and operations of the respective members are substantially the same except that the colors of the toners used are different from each other, and therefore, the suffixes will be appropriately omitted except for the case where distinction of the members is needed.

Figure 1:
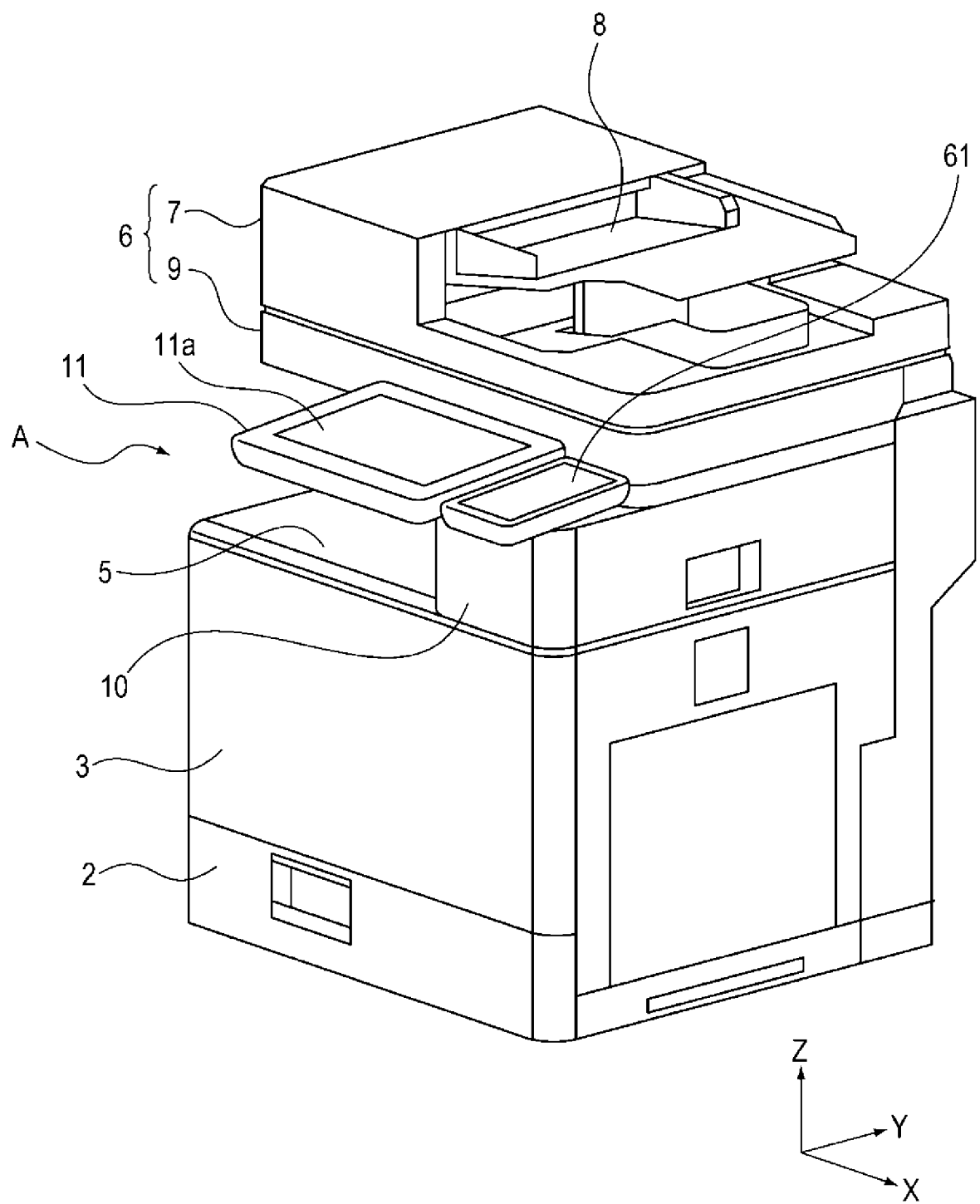
FIG. 1 is a perspective view of an image forming apparatus.
Figure 2:
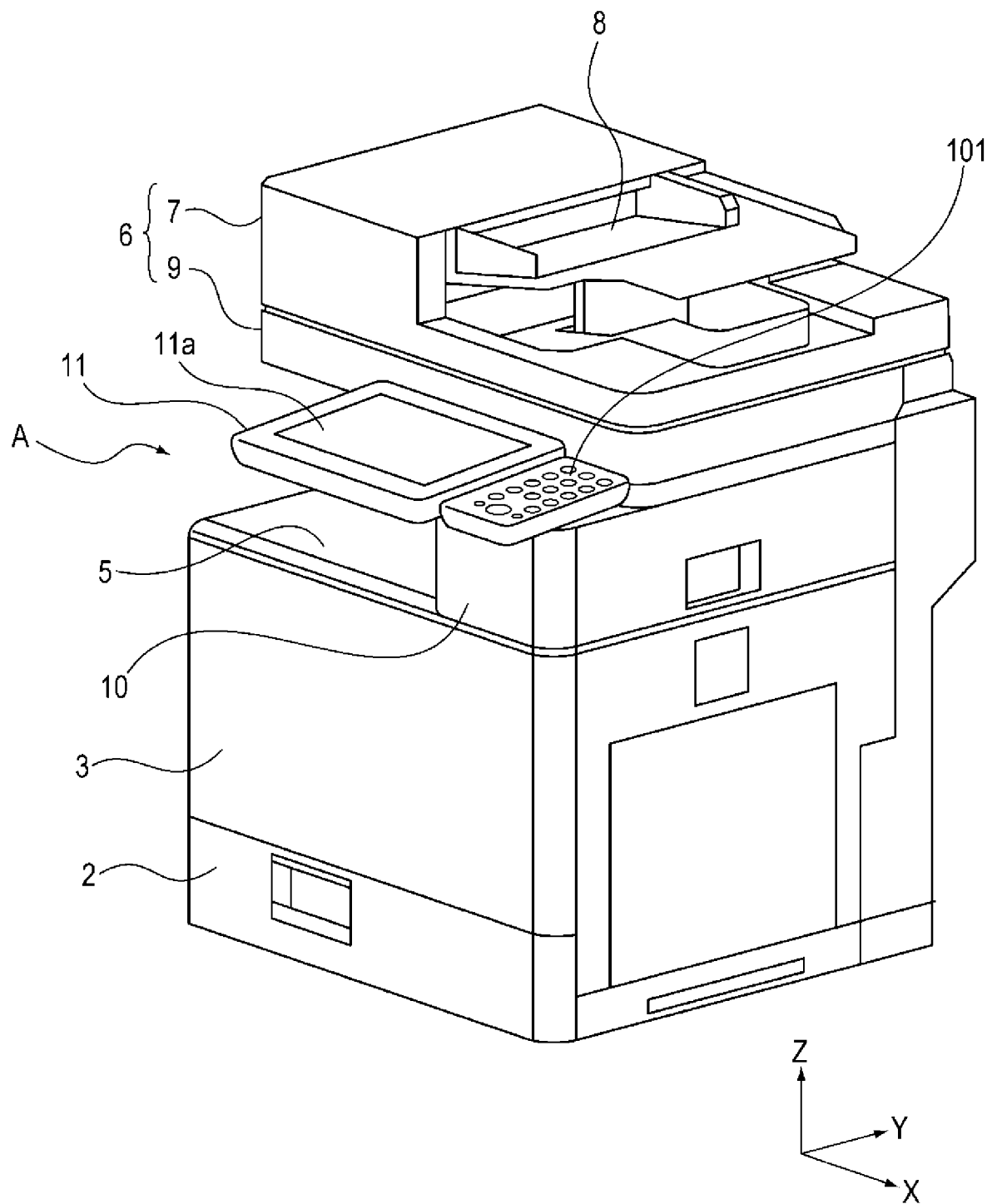
FIG. 2 is a perspective view of an image forming apparatus.
Figure 3:
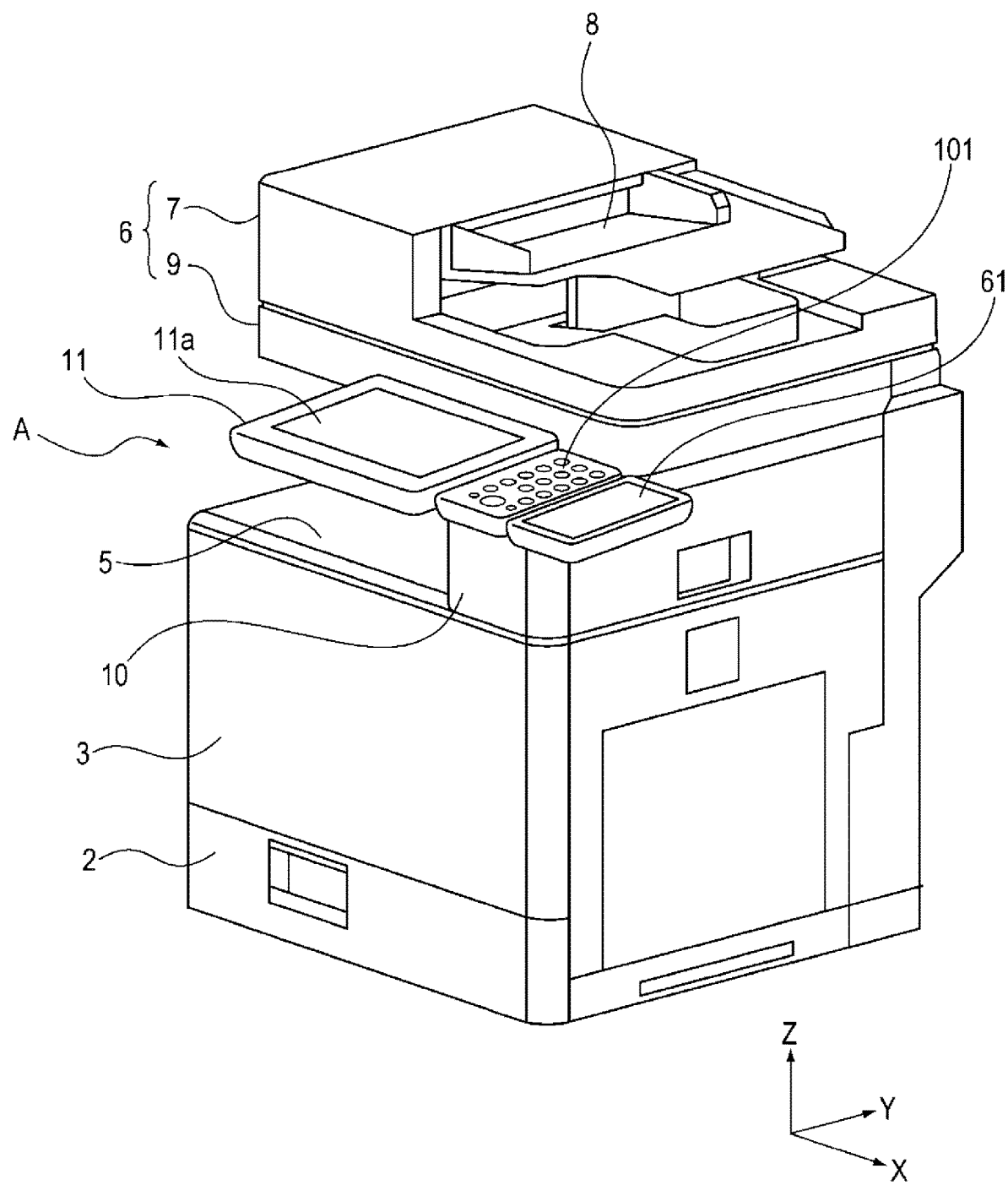
FIG. 3 is a perspective view of an image forming apparatus.

FIGS. 1, 2 and 3 are perspective views of the image forming apparatus A. As shown in FIGS. 1 to 3, the image forming apparatus A is constituted so that beside an operating portion 11 of a touch panel type, a numeric keypad device 101 and/or an IC card reader 61 can be additionally provided depending on user's request (demand). That is, the numeric keypad device (input device) 101 and the IC card reader 51 are separate members from an apparatus main assembly 3 and the operating portion 11 of the image forming apparatus A and are option devices capable of being arbitrarily mounted in and dismounted from the apparatus main assembly 3 of the image forming apparatus A. FIG. 1 is a perspective view of the image forming apparatus A in a state in which the IC card reader 61 is additionally provided. FIG. 2 is a perspective view of the image forming apparatus A in a state in which the numeric keypad device 101 is additionally provided. FIG. 3 is a perspective view of the image forming apparatus A in a state in which the IC card reader 61 and the numeric keypad device 101 are additionally provided. Incidentally, in the case where both the numeric keypad device 101 and the IC card reader 61 are additionally provided, the operating portion 11, the numeric keypad device 101 and the IC card reader 61 may also be arranged adjacent to each other so that the numeric keypad device 101 and the IC card reader 61 project from a right side surface of the apparatus main assembly 3.

The operating portion 11 is rotatably supported by the apparatus main assembly 3 of the image forming apparatus A and is arranged so that a display portion 11a is directed upwardly. On the display portion 11a of the operating portion 11, various pieces of information are displayed. Further, the display portion 11a is capable of displaying numeric keypads as software keys permitting input of numerical values. A user is capable of inputting input numerical value information to the device by touch of a display part of the software key(s) with user's finger(s) or by bringing the user's finger(s) near to the display part of the software key(s). In this way, the user inputs the numerical value(s) by operating the operating portion 11, so that the user is capable of making setting as the image formation such as setting of a kind of a sheet S, setting of an output size, setting of the number of sheets subjected to image formation, and the like setting. The operating portion 11 is not provided with numeric keypads as hardware keys.

Figure 10:
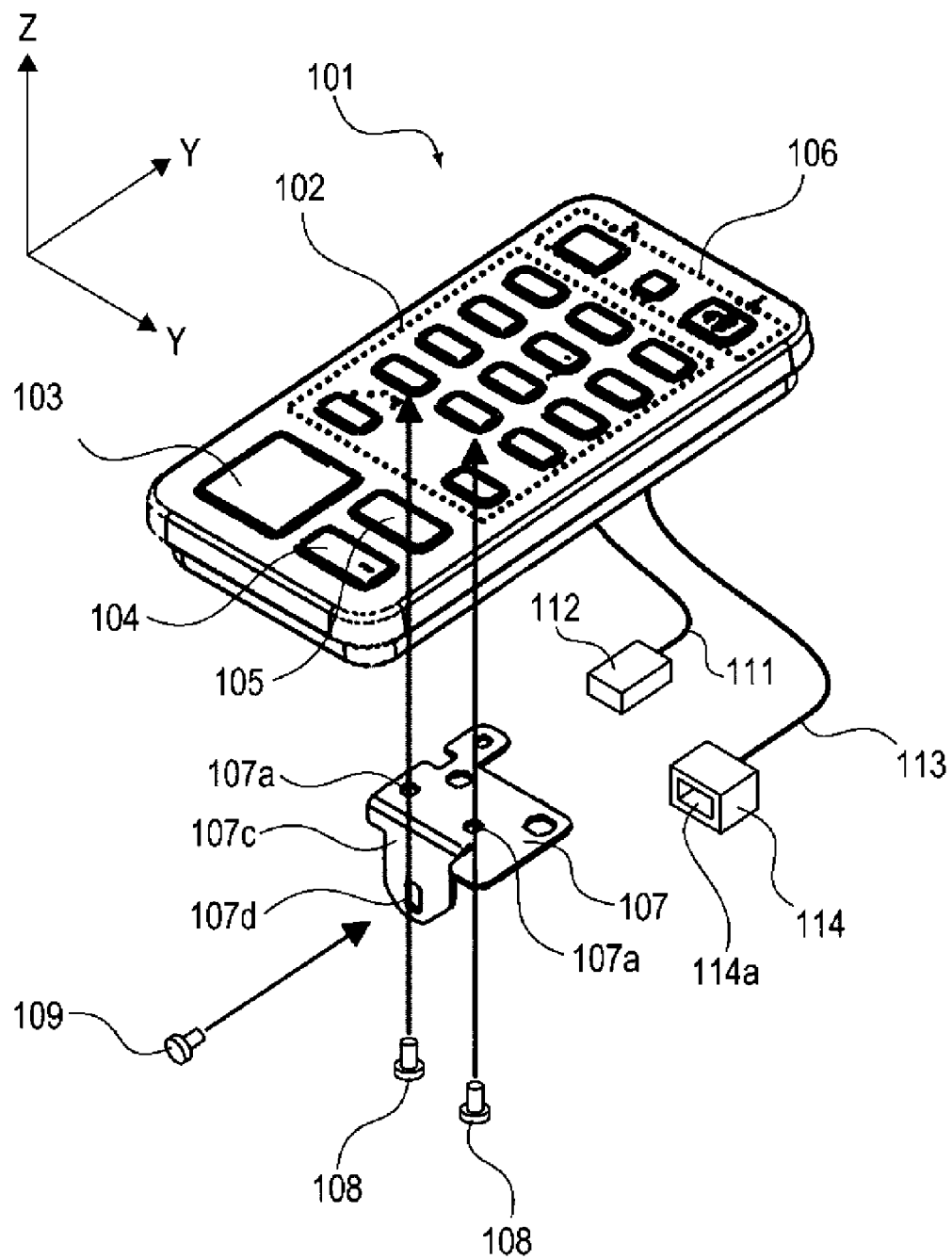
FIG. 10 is an exploded perspective view of the numeric keypad device and a fixing member thereof.

The numeric keypad device 101 is arranged on a right side of the operating portion 11 as seen from a front side (surface) of the apparatus main assembly 3 of the image forming apparatus A. Here, the front side (surface) is a side (surface) where the user stands when the user operates the operating portion 11. That is, with respect to four directions of the image forming apparatus A, the operating portion 11 is arranged adjacent to an image reading device 6, and the side where the operating portion 11 is disposed is the front side of the image forming apparatus. The four directions in this embodiment include X direction and Y direction in FIG. 1. With respect to the four directions of the image forming apparatus A, when the user stands on the front side, the user most easily operates the operating portion 11. As shown in FIG. 10, the numeric keypad device 101 includes, as hardware keys, numerical value keys 102 for setting numerical values and symbols, a start key 103 for operating (working) the image forming apparatus A, and a stop key 104 for stopping the operation of the image forming apparatus A. Further, the numeric keypad device 101 includes, as hardware keys, a reset key 105 for resetting input information and function keys 106 for setting other functions.

the pieces of input information to these various keys are processed by a key controller 90 (FIG. 13) and are inputted to a controller 70 (FIG. 5) of the apparatus main assembly 3. The controller 70 causes the display portion 11a of the operating portion 11 to display the input information of the numeric keypad device 101. Incidentally, the numeric keypad device 101 may only be required to include at least the numerical value keys 102 as the hardware keys.

Users who are unaccustomed to operating the touch panel and users who like operation feeling of the numeric keypads exist. Such users request that in addition to the operating portion 11 of the touch panel type in which the numeric keypads as the hardware keys are not provided, the numeric keypad device 101 provided with the numeric keypads as the hardware keys of the conventional type is additionally provided as an option. In order to meet the request, manufacturers provide, as the option, the numeric keypad device 101 to the users.

Figure 14:
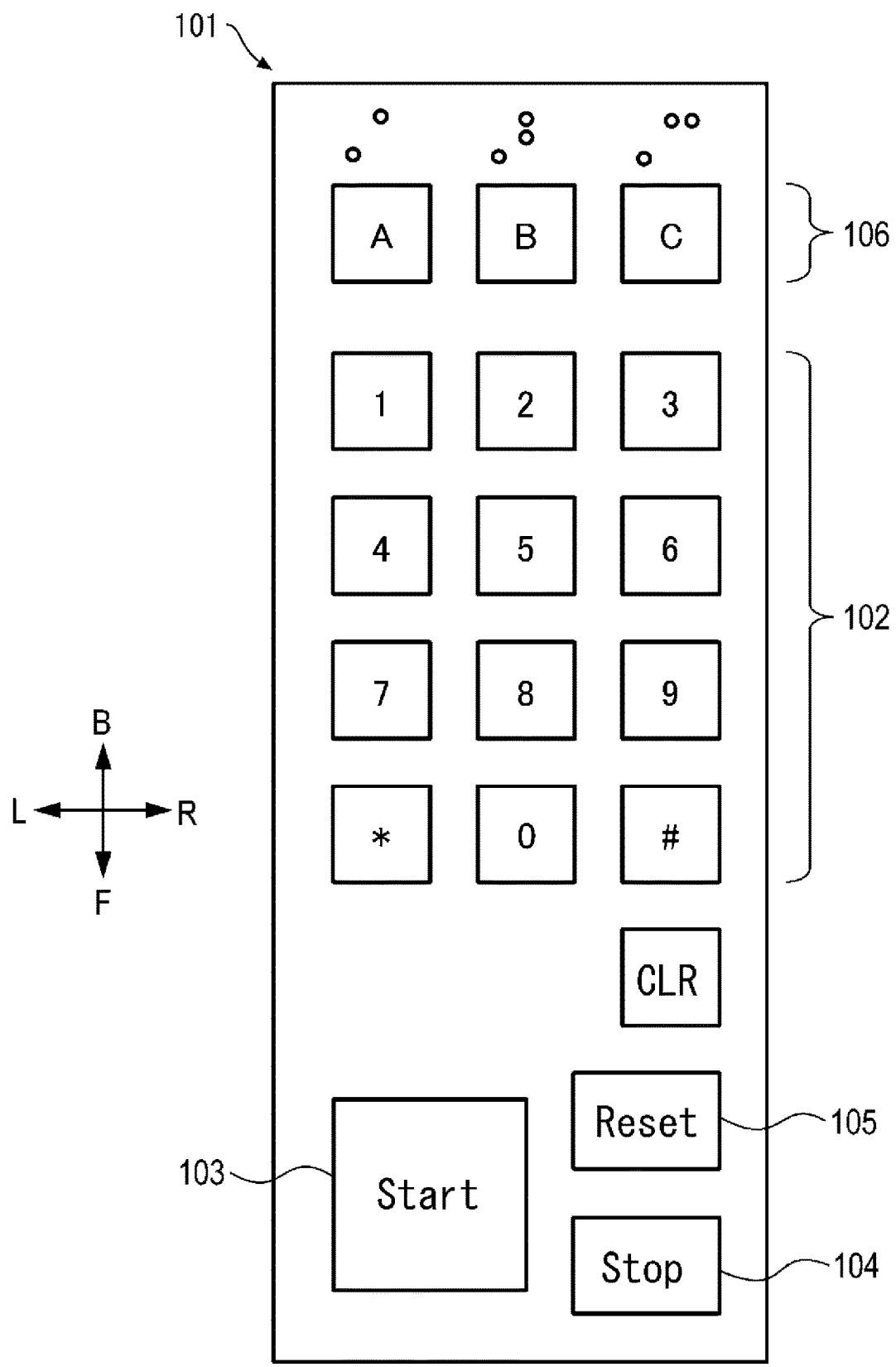
FIG. 14 is a schematic view showing an arrangement of hardware keys of the numeric keypad device.

As an example of uses of the numeric keypad device 101, it is possible to cite input of numerical values such as the number of sheets subjected to image formation, a designation number of a facsimile, and the like. For this reason, arrangement of the numeric keypads of the numeric keypad device 101 is pursuant to numerical value arrangement of a telephone. That is, as shown in FIG. 14, of 10 hardware keys from 0 to 9, a row of hardware keys of 1, 2 and 3 is arranged on a rearmost side, a row of hardware keys of 4, 5 and 6 is arranged on the front side of the row of hardware keys of 1, 2 and 3, and a row of hardware keys of 7, 8 and 9 is arranged on the front side of the row of hardware keys of 4, 5 and 6. Further, a hardware key of 0 is arranged on the front side of the row of hardware keys of 7, 8 and 9. Further, when these hardware keys are seen along a column direction, a column of hardware keys of 1, 4 and 7, a column of hardware keys of 2, 5 and 8, and a column of hardware keys of 3, 6 and 9 are arranged in a named order from the left side of the numeric keypad device 101. Incidentally, the hardware key of 0 may also be included in the column of hardware keys of 1, 4 and 7 or the column of hardware keys of 3, 6 and 9.

Figure 13:
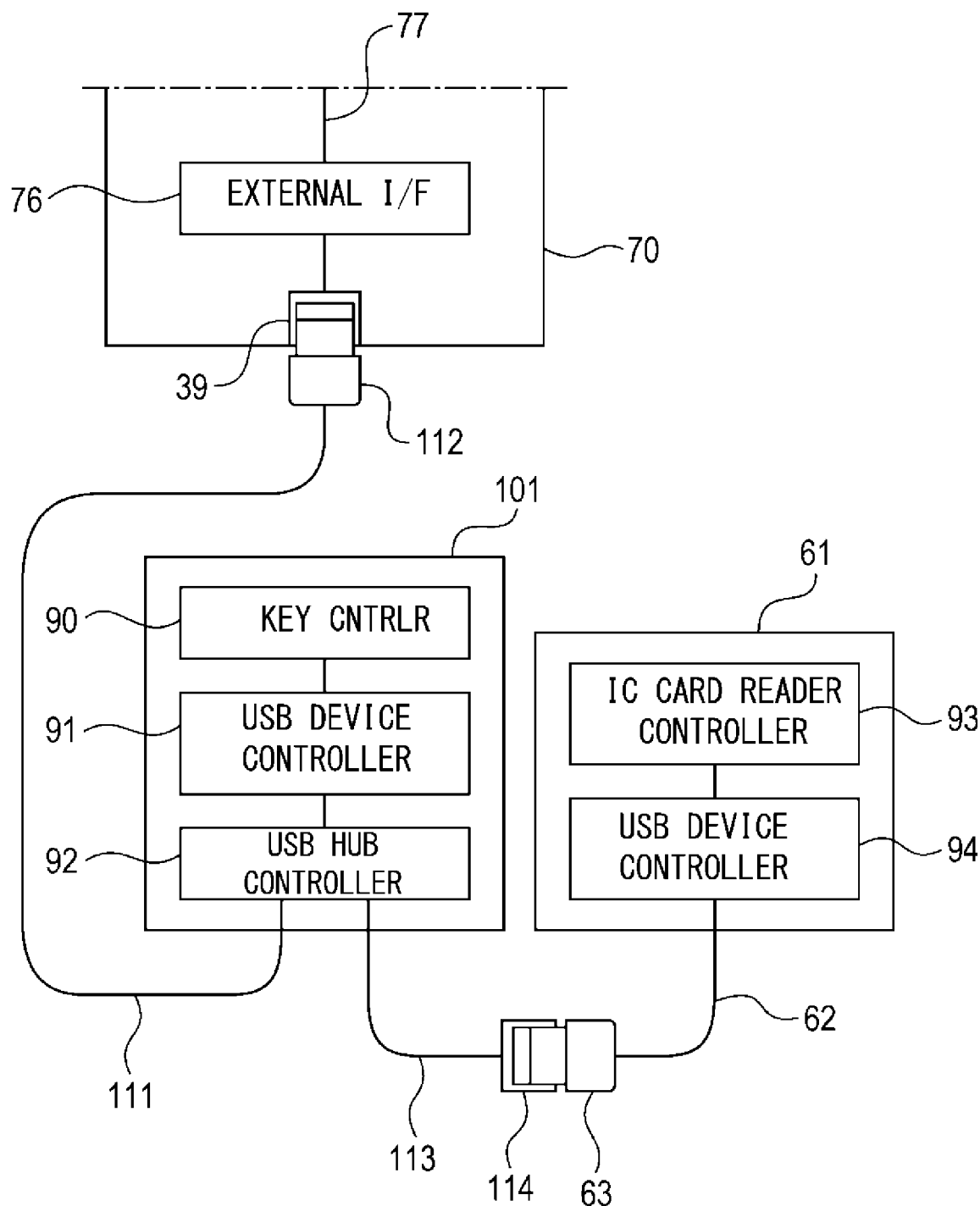
FIG. 13 is a block diagram showing a system constitution of the IC card reader and the numeric keypad device.

In the image forming apparatus A provided with no numeric keypad device 101, the IC card reader 61 is arranged adjacent to the operating portion 11 on the right side of the operating portion 11 as seen from the front side of the apparatus main assembly 3 of the image forming apparatus A. In the image forming apparatus A additionally provided with the numeric keypad device 101, the IC card reader 61 is arranged adjacent to the numeric keypad device 101 on the right side of the numeric keypad device 101 as seen from the front side of the apparatus main assembly 3 of the numeric keypad device 101. Further, the numeric keypad device 101 is arranged adjacent to the operating portion 11 on the right side of the operating portion 11. In this case, the IC card reader 61 is provided to the apparatus main assembly A so that at least a part of the IC card reader 61 projects from a right-side surface (right-side wall) of the apparatus main assembly 3. Here, the right-side surface of the apparatus main assembly 3 refers to the surface (wall) of the image forming apparatus A on the right side shown in FIG. 4. A sheet (paper) feeding device as an option is disposed on a further right side of the apparatus main assembly A in FIG. 14 in some instances, but the sheet feeding device is not included in the apparatus main assembly 3 of the image forming apparatus A. The IC card reader 61 is a device for magnetically reading IC card information of a user. The IC card information read by the IC card reader 61 is used for processing individual authentication (certification) by an IC card reader controller 93 (FIG. 13). That is, the IC card reader 61 is a device for receiving the user information from the IC card. A mounting constitution of the IC card reader 61 and the numeric keypad device 101 will be described later.

Figure 4:
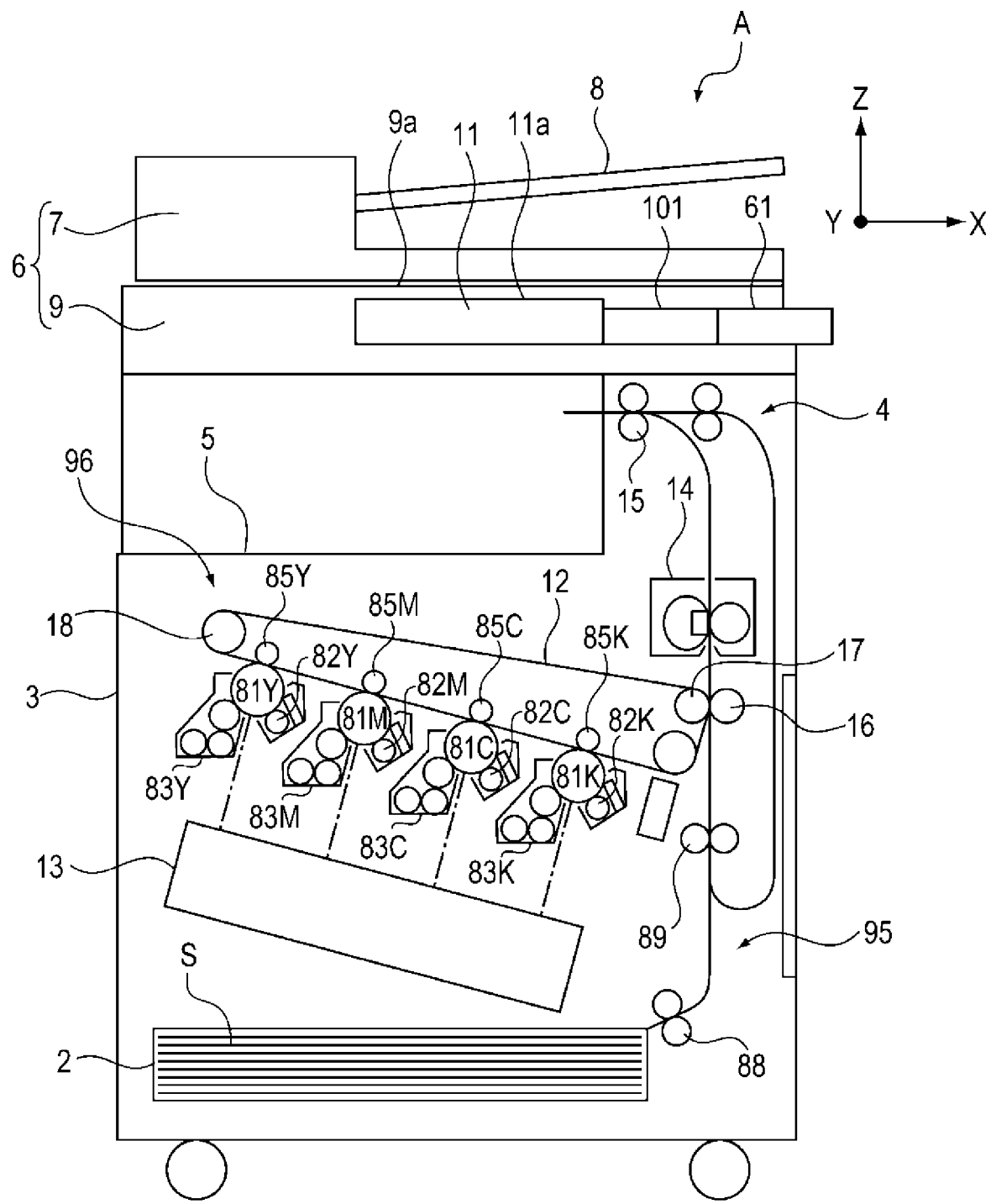
FIG. 4 is a schematic sectional view of the image forming apparatus.

FIG. 4 is a schematic sectional view of the image forming apparatus A according to this embodiment. As shown in FIG. 4, the image forming apparatus A includes an image forming portion 96 for forming the image on the sheet by transferring a toner image onto the sheet, a sheet feeding portion 95 for feeding the sheet toward the image forming portion 96, and a fixing device 14 as a fixing portion for fixing the toner image on the sheet. The apparatus main assembly 3 is a frame for supporting the image forming portion 96, the sheet feeding portion 95 and the fixing device 14. Inside the apparatus main assembly 3, for example, a metal frame for supporting (holding) the image forming portion 96, the sheet feeding portion 95 and the fixing device 14, and an outer casing frame mounted to the metal frame and made of a resin material are provided. The outer casing frame is a member for covering the image forming portion 96, the sheet feeding portion 95 and the fixing device 14.

The image forming portion 96 includes photosensitive drums 81 (81Y, 81M, 81C, 81K), charging rollers 82 (82Y, 82M, 82C, 82K), and developing devices 83 (83Y, 83M, 83C, 83K). The image forming portion 96 further includes primary transfer rollers 85 (85Y, 85M, 85C, 85K), a laser scanner unit 13, an intermediary transfer belt 12, a secondary transfer roller 16, a secondary transfer opposite roller 17, a driving roller 18 and the like.

Further, at an upper portion of the image forming apparatus A, the first reading device 6 for reading an image of an original is provided. The image forming portion is constituted by a flat head scanner 9 and an ADF 7. The flat head scanner 9 optically reads the first of the original placed on a reading surface 9a formed of a glass plate and then converts the read original image to image data. The ADF 7 automatically feeds an original placed on an original tray 8 and then reads an image. The ADF 7 is rotatably supported and is opened upwardly by being rotated, so that the user has access to the reading surface 9a of the flat head scanner 9. Incidentally, in order not to prevent accessibility when the original is set on the reading surface 9a, an uppermost part of the operating portion 11 is disposed at a position lower than the reading surface 9a.

<Image Forming Operation>

Next, an image forming operation by the image forming apparatus A will be described. First, when to a controller 70 shown in FIG. 5 an image forming job is inputted, a sheet S stacked and accommodated in a sheet cassette 2 is sent to a registration roller pair 89 by a feeding roller pair 88. Then, the sheet S is sent, by the registration roller pair 89 at predetermined timing, to a secondary transfer portion formed between the secondary transfer roller 16 and the secondary transfer opposite roller 17.

On the other hand, in the image forming portion 96, first, the surface of the photosensitive drum 81Y is electrically charged by the charging roller 82Y. Thereafter, depending on an image signal sent from an unshown external device or the like, the surface of the photosensitive drum 81Y is irradiated with laser light by the laser scanner unit 13, so that, on the surface of the photosensitive drum 81Y, an electrostatic latent image is formed.

Thereafter, a toner image is formed on the surface of the photosensitive drum 81Y by depositing toner of yellow on the electrostatic latent image, formed on the surface of the photosensitive drum 81Y, by the developing device 83Y. A toner image formed on the surface of the photosensitive drum 81Y is primary-transferred onto the intermediary transfer belt 12 by applying a primary transfer bias to the primary transfer roller 85Y.

By a similar process, toner images of magenta, cyan and black are formed on the photosensitive drums 81M, 81C and 81K. Then, by applying a primary transfer bias to the primary transfer rollers 85M, 85C and 85K, so that these toner images are superposedly transferred onto the yellow toner image on the intermediary transfer belt 12. As a result, a full-color toner image is formed on the surface of the intermediary transfer belt 12.

Thereafter, the intermediary transfer belt 12 is moved and circulated by transmission of a driving force from the driving roller 18, so that the full-color toner image is sent to a secondary transfer portion. Then, at the secondary transfer portion, the full-color toner image on the intermediary transfer belt 12 is transferred onto the sheet S by applying a secondary transfer bias to the secondary transfer roller 16.

Then, the sheet S on which the toner image is transferred is subjected to a heating and pressing treatment in the fixing device 14, whereby the toner image is fixed on the sheet S. Thereafter, the sheet S on which the toner image is fixed passes through a vertical passage portion and is fed to a discharging roller pair 15, and then is discharged onto a discharge portion 5 by the discharging roller pair 15. Incidentally, in the vertical passage portion 4 is provided with a sensor (not shown) for detecting a sheet S and a fan (not shown) for sending air. The vertical passage portion 4 is covered with a vertical passage cover 10 which is an outer casing cover.

<Controller>

Next, an outline of a system constitution of the image forming apparatus A will be described.

Figure 5:
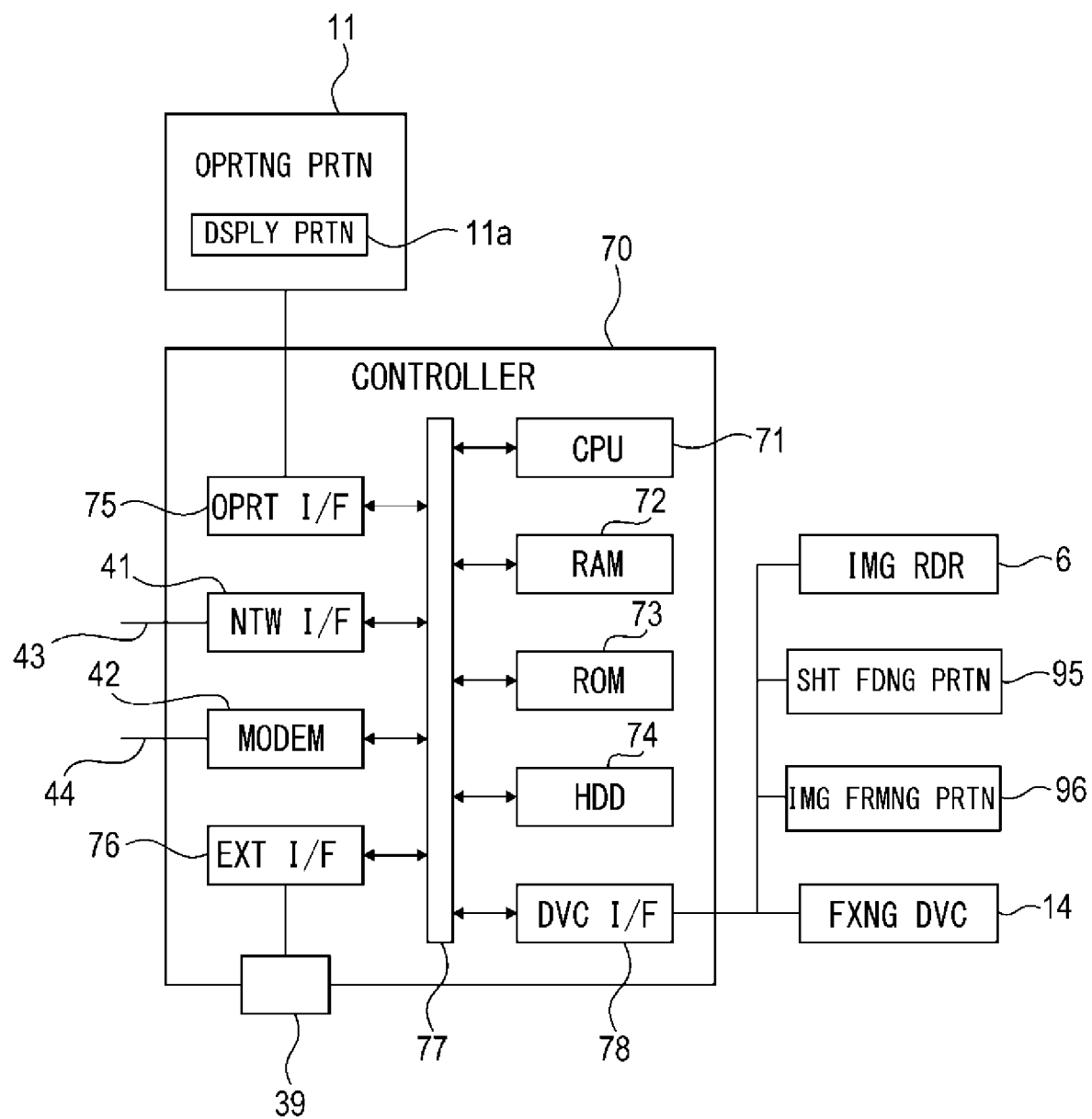
FIG. 5 is a block diagram showing a system constitution of the image forming apparatus.

FIG. 5 is a block diagram showing a part of the system constitution of the image forming apparatus A. As shown in FIG. 5, the image forming apparatus A includes the controller 70 including a CPU 71, a ROM 72, a RAM 73 and an HDD 74. These members are connected to a system bus 77.

The ROM 72 and the HDD 74 store various data such as a control program, a table and the like. The CPU 71 carries out various arithmetic processing on the basis of control programs and information stored in the ROM 72 and the HDD 74. The RAM 73 temporarily stores data.

That is, the controller 70 controls respective devices connected thereto through a device output/input circuit (I/F) 78 while the CPU 71 uses the RAM 73 as an operational space (working area) on the basis of the control programs stored in the ROM 72 and the HDD 74. Further, the controller 70 carries out the above-described image forming operation through control of the respective devices.

To the controller 70, the operating portion 11 is connected through an operating portion input/output circuit (I/F) 75.

The controller 70 receives signals from the operating portion 11 and causes various devices of the image forming apparatus A to operate. Further, the controller 70 causes the display portion 11a of the operating portion 11 to display various pieces of information.

The controller 70 includes an external portion input/output circuit (I/F) 76. The external portion input/output circuit (I/F) 76 is connected to the numeric keypad device 101 and the IC card reader 61 through a USB connector 39 of the apparatus main assembly 3 as described later.

Further, the controller 70 includes a network input/output circuit (I/F) 41 and a modem 42. The network input/output circuit (I/F) 41 is connected to a network 43 and carries out input and output of information. The modem 42 is connected to a public line (network) 44 and functions as a facsimile communication portion capable of facsimile transmission and reception, so that the modem 42 carries out input and output of information.

<Mounting Constitution of IC Card Reader>

Next, a constitution when only the IC card reader 61 is mounted will be described.

Figure 6:
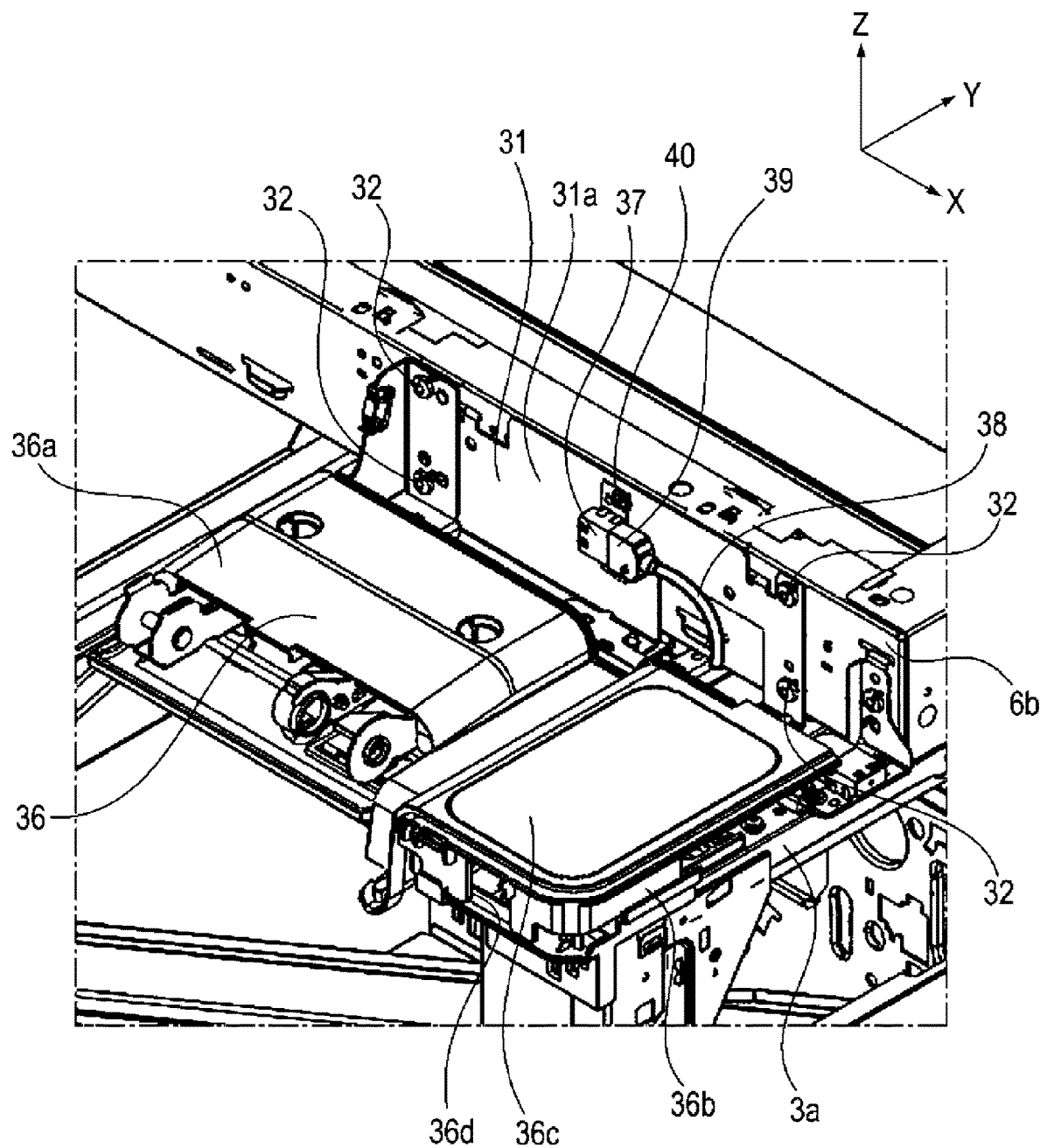
FIG. 6 is an enlarged device of an IC card reader and a periphery thereof.
Figure 7:
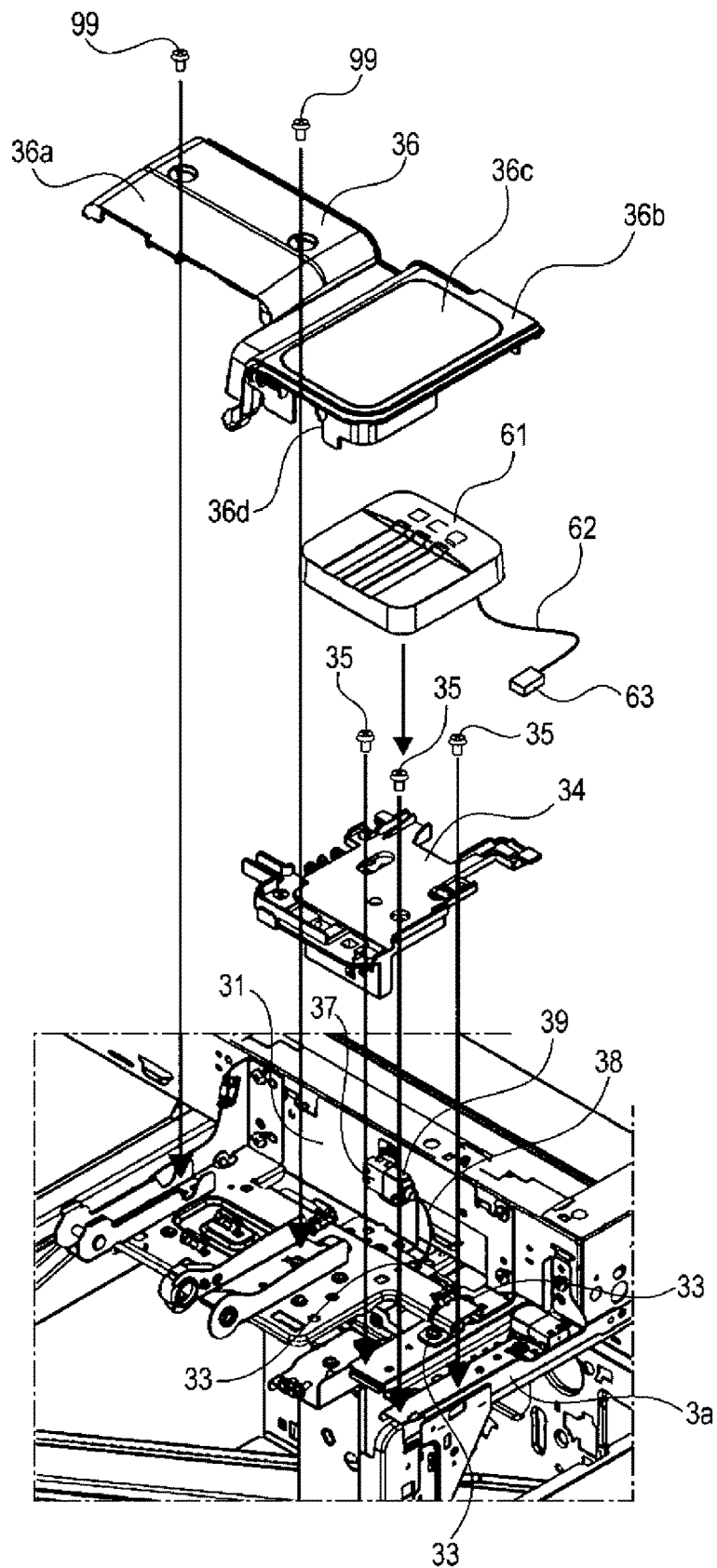
FIG. 7 is an exploded perspective view of the IC card reader and the periphery thereof.

FIG. 6 is an enlarged perspective view of the IC card reader 61 and a periphery thereof. FIG. 7 is an exploded perspective view of the IC card reader 61 and a periphery thereof. In FIGS. 6 and 7, the operating portion 11 is removed.

As shown in FIGS. 6 and 7, a fixing table 31 which is a substantially L-shaped metal plate member is fixed to a front-side frame 6b and a top surface of a stay 3a which is a frame of the apparatus main assembly 3, by screws 32 and 33, respectively. To a vertical surface 31a of the fixing table 31, a USB connector 39 provided with an unshown USB port is fixed by a screw 40 through a connector supporting member 37. The USB connector 39 is electrically connected to the controller 70 which is a control substrate provided on a rear (surface) side through a cable 38.

To a top surface of the stay 3a, a mounting table 34 is fixed by a plurality of screws 35. On the mounting table 34, the IC card reader 61 is mounted. After the IC card reader 61 is mounted on the mounting table 34, a USB plug 63 connected to the IC card reader 61 through a cable 62 is connected to the USB connector 39 of the apparatus main assembly 3. As a result, electrical connection between both members is established. In the case where there is an excessive length of the cable 62, processing of the excessive length is performed in front of the vertical surface 31a of the fixing table 31.

After the IC card reader 61 is mounted, to the fixing table 31, a cover member 36 is fixedly by screws 99. The cover member 36 is made of a resin material and includes a mounting portion 36a on which the operating portion is mounted and a cover portion 36b covering the IC card reader 61.

The cover portion 36b is provided with a plurality of unshown openings for permitting a user to visually recognize an unshown LED of the IC card reader 61. These openings are closed (blocked) by a blocking sheet 36c bonded to the cover portion 36b by a double-side tape or the like. By adjusting a thickness of the blocking sheet 36c, it is possible to suppress a lowering in detection performance of the IC card reader 61 due to the blocking sheet 36c.

<Mounting Constitution of Numeric Keypads>

Next, a constitution when only the numeric keypad device 101 is mounted will be described.

Figure 8:
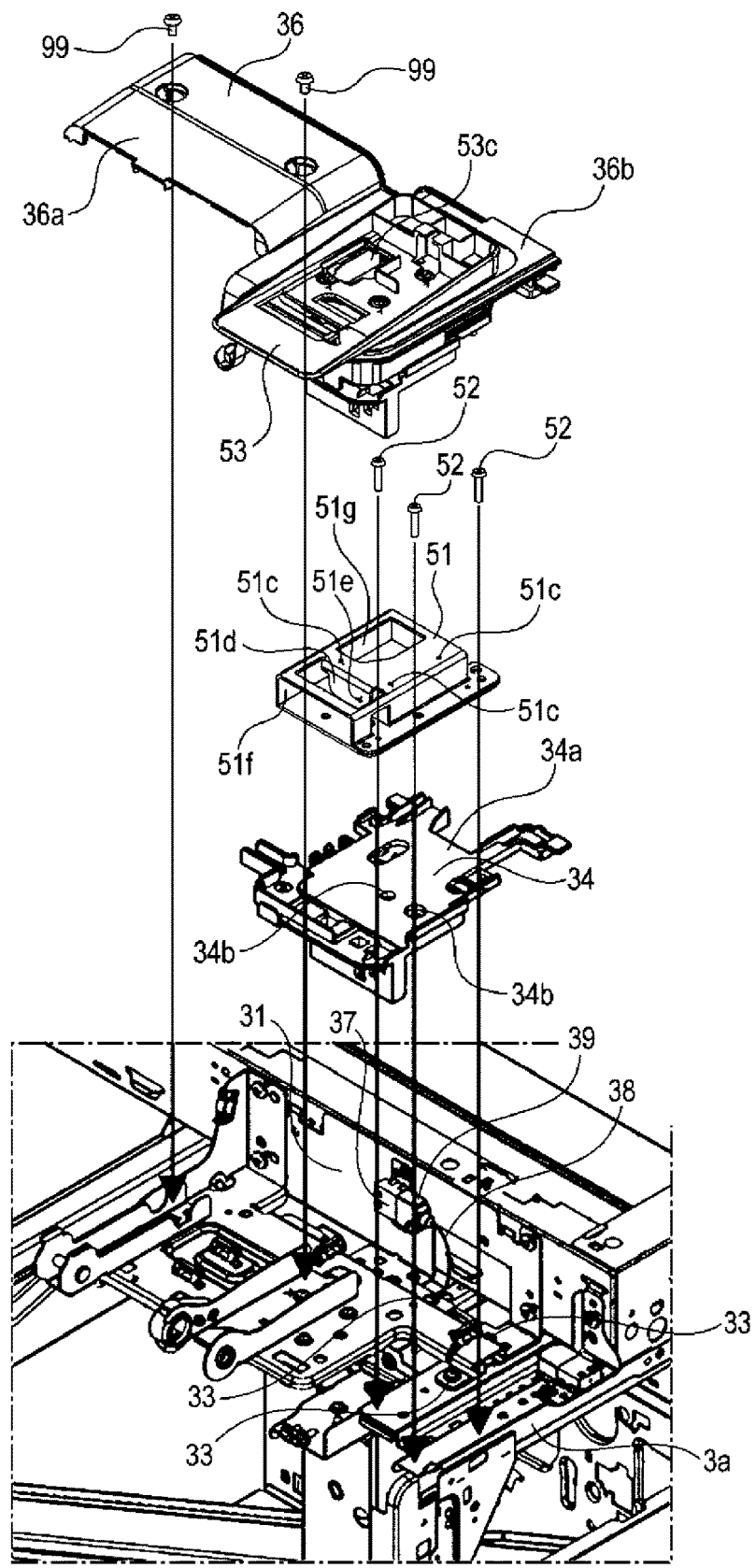
FIG. 8 is an exploded perspective view of a numeric keypad device and a periphery thereof.
Figure 9:
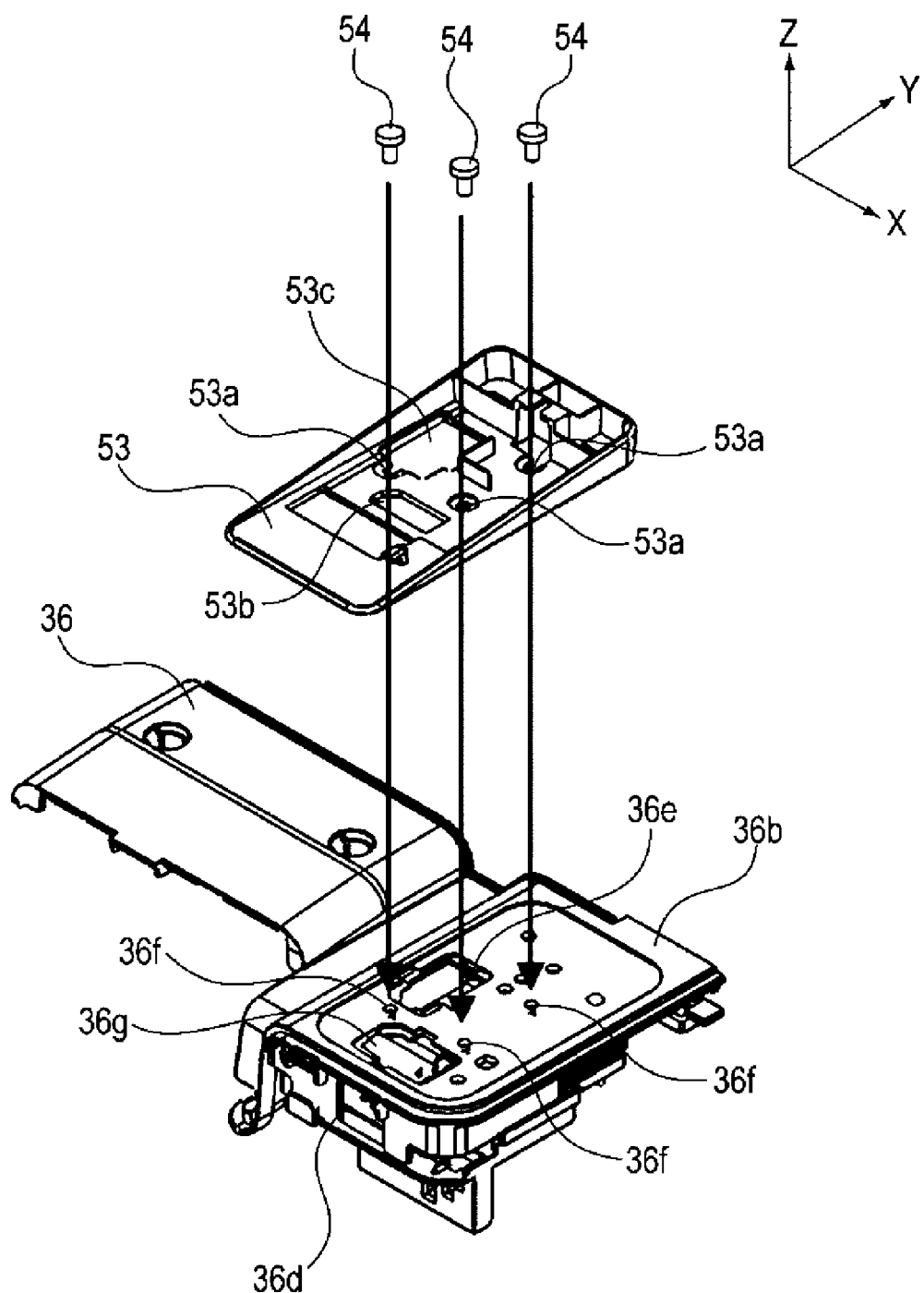
FIG. 9 is an exploded perspective view of a cover member and a lower numeric keypad cover.

FIG. 8 is an exploded perspective view of the numeric keypad device 101 and a periphery thereof. FIG. 9 is an exploded perspective view of the cover member 36 and a lower numeric keypad cover 53. FIG. 10 is an exploded perspective view of the numeric keypad device 101 and a fixing member 107.

As shown in FIG. 8, when the numeric keypad device 101 is mounted, first, to the mounting table 34, a numeral keypad supporting table 51 formed by welding two (upper and lower) metal plate members to each other is fixed by screws 52. The numeral keypad supporting table 51 includes a bent portion 51d bent downwardly from a top surface thereof, a top surface opening 51g and a front surface (side) opening 51f. Incidentally, screw holes 34b of the mounting table 34 are formed at a portion lower by one stage than the mounting surface 34a where the numeral keypad supporting table 51 is mounted, and therefore, there is a need to use long-size screws 52.

Next, similarly during mounting of the IC card reader 61, the cover member 36 is fixed to a fixing table 31 by screws 99. Then, the lower numeric keypad cover 53 is fixed to the cover member 36 and the numeral keypad supporting table 51, so that the numeric keypad device 101 is mounted on the lower numeric keypad cover 53. Thereafter, as specifically described later, the numeric keypad device 101 is fixed to the apparatus main assembly 3 through the fixing member 107. As a result, the numeric keypad device 101 is fixed to the apparatus main assembly 3. Finally, the vertical passage cover 10 is fixed to the apparatus main assembly 3 by unshown screws.

In a process in which the numeric keypad device 101 is fixed to the apparatus main assembly 3, a USB plug 112 connected to a main body of the numeric keypad device 101 through a cable 111 is connected to a USB connector 39 of the apparatus main assembly 3. The USB plug 112 passes through a top surface opening 53c of the lower numeric keypad cover 53, a top surface opening 36e of the cover member 36 and a top surface opening 51g of the numeral keypad supporting table 51 and is connected to the USB connector 39 of the apparatus main assembly 3. As a result, electrical connection between the numeric keypad device 101 and the controller 70 of the apparatus main assembly 3 is established. Incidentally, there is an excessive length of the cable 111, processing of the excessive length is carried out in front of the vertical surface 31a of the fixing table 31.

As shown in FIG. 9, when the lower numeric keypad cover 53 is mounted on the cover member 36 and the numeral keypad supporting table 51, screws 54 are inserted into screw holes 53a of the lower numeric keypad cover 53, screw holes 36f of the cover member 36 and screw holes 51c (FIG. 8) of the numeral keypad supporting table 51 and are fastened. As a result, the lower numeric keypad cover 53 is fixed to the cover member 36 and the numeral keypad supporting table 51.

As shown in FIG. 10, the numeric keypad device 101 and the fixing member 107 are fixed to each other by inserting and fastening screws 108 in screw holes (not shown) formed in a bottom (surface) of the numeric keypad device 101 and screw holes 107a formed in a top surface of the fixing member 107. Further, during fixing between the fixing member 107 and the lower numeric keypad cover 53, first, a bent portion 107c bent downwardly from the top surface of the fixing member 107 passes the opening 53b of the lower numeric keypad cover 53 and the top surface opening 36g of the cover member 36 and contacts a bent portion 51d of the numeral keypad supporting table 51. Then, a position of a screw hole 107d of the bent portion 107c of the fixing member 107 and a position of a screw hole 51e of the bent portion 51d of the numeral keypad supporting table 51 are aligned with each other, and the fixing member 107 and the numeral keypad supporting table 51 are fixed to each other by a screw 109. At this time, the screw 109 passes through a front surface (side) opening 36d of the cover member 36 and a front surface opening 51g of the numeral keypad supporting table 51. Thus, the numeric keypad device 101 is mounted on the apparatus main assembly 3 through the fixing member 107.

<Mounting Constitution of IC Card Reader and Hardware Keys)

Next, a constitution in which both the IC card reader 61 and the numeric keypad device 101 are mounted will be described.

Figure 11:
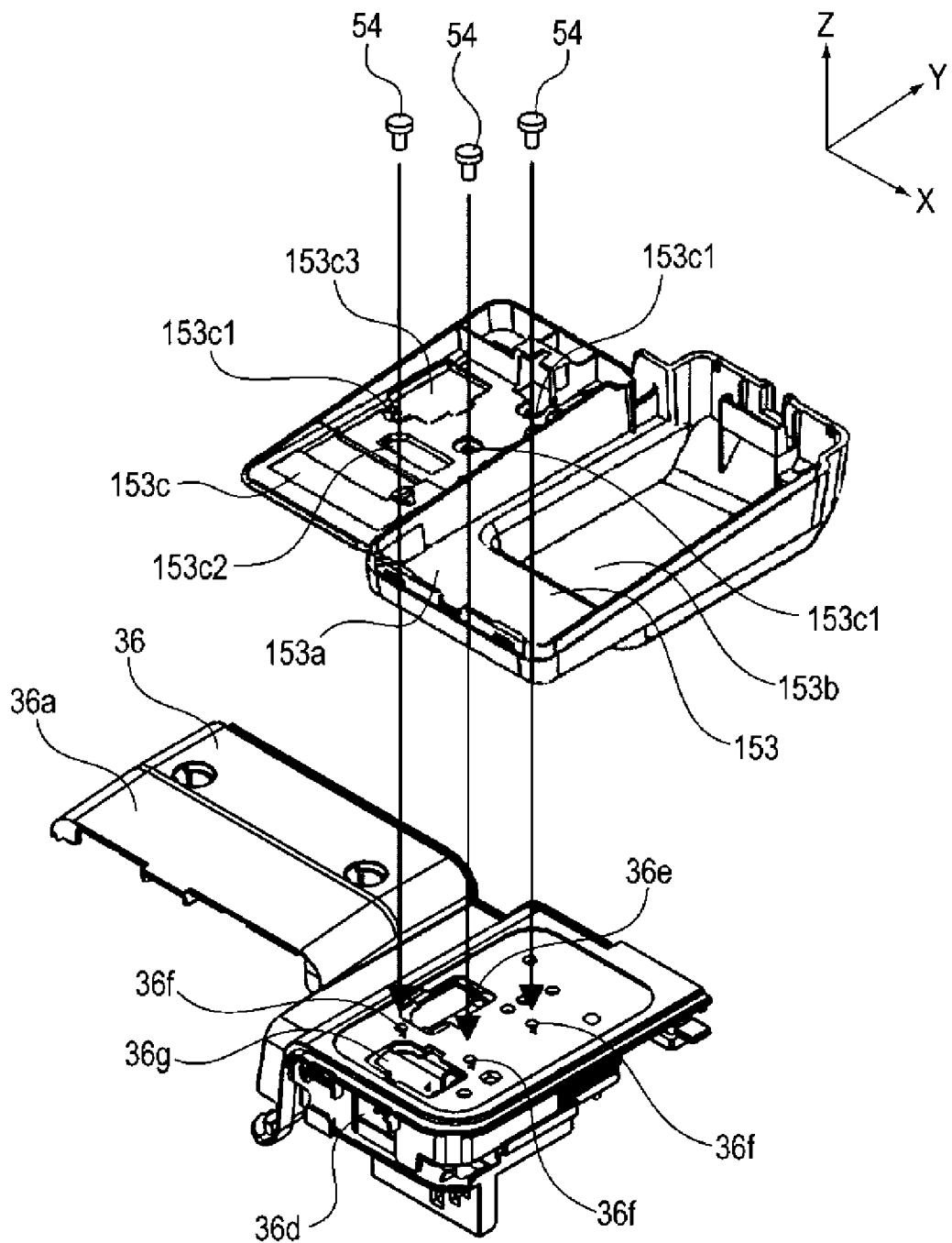
FIG. 11 is an exploded perspective view of the cover member and an accommodating member thereof.
Figure 12:
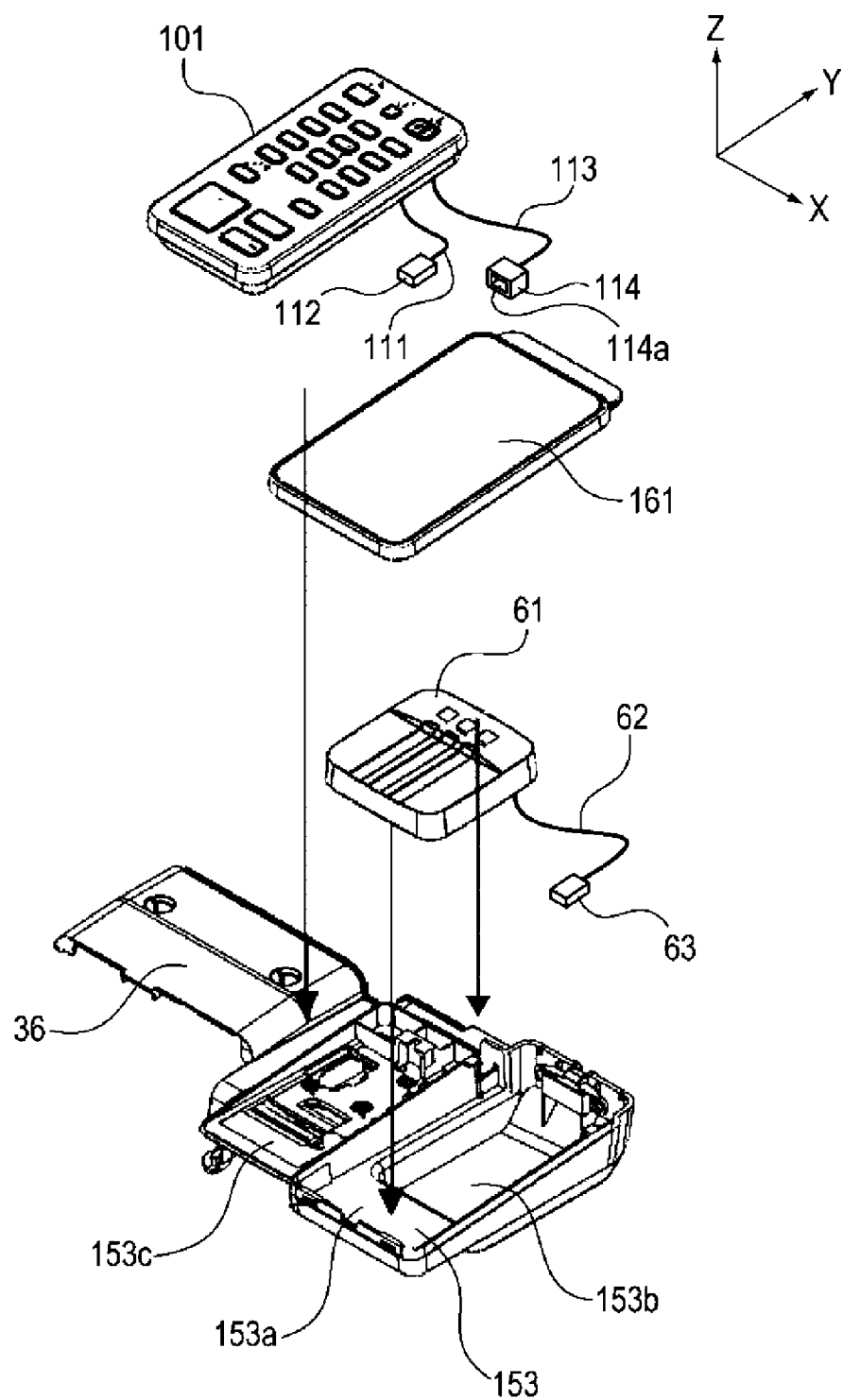
FIG. 12 is an exploded perspective view of the accommodating member, the IC card reader and the numeric keypad device.

FIG. 11 is an exploded perspective view of the cover member 36 and an accommodating member 153. FIG. 12 is an exploded perspective view of the accommodating member 153, the IC card reader 61 and the numeric keypad device 101.

As shown in FIGS. 11 and 12, the IC card reader 61 and the numeric keypad device 101 are mounted to the cover member 36 through the accommodating member 153. That is, the accommodating member 153 is a holding member, mounted to the apparatus main assembly 3, for integrally holding the IC card reader 61 and the numeric keypad device 101. When the accommodating member 153 is fixed to the cover member 36, the numeral keypad supporting table 51 is fixed to the mounting table 34 by the above-described method.

The accommodating member 153 includes a reader accommodating portion (second holding portion) 153a for accommodating the IC card reader 61, a numeric keypad accommodating portion (first holding portion) 153c for accommodating the numeric keypad device 101, and a cable accommodating portion (recessed portion) 153b. The cable accommodating portion 153b is in a position recessed from the numeric keypad accommodating portion 153c, and in the cable accommodating portion 153b, a cable 62 of the IC card reader 61 and a cable 113 of the numeric keypad device 101 are accommodated in a state in which these cables 62 and 113 are wound plural times. In this embodiment, the accommodating member 153 is made of a resin material, and the reader accommodating portion 153a, the numeric keypad accommodating portion 153c and the cable accommodating portion 153b are integrally molded. However, the present invention is not limited thereto, but a constitution in which these members are individually manufactured and are integrally fixed by screws or the like.

The numeric keypad accommodating portion 153c has the same shape as the lower numeric keypad cover 53. That is, the accommodating member 153 is a member in which the reader accommodating portion 153a and the cable accommodating portion 153b are integrally combined with each other, and the numeric keypad device 101 is fixed to and accommodated in the numeric keypad accommodating portion 153c by a method similar to the above-described method. Incidentally, screw holes 153c1, an opening 153e2 and a top surface opening 153c3 of the numeric keypad accommodating portion 153c correspond to the screw holes 53a, the opening 53b and the top surface opening 53c of the lower numeric keypad cover 53, respectively.

Further, the IC card reader 61 is mounted in the reader accommodating portion 153a. Thereafter, a reader cover 161 for covering the IC card reader 61 is fixed to the reader accommodating portion 153a of the accommodating member 153 by unshown screws or by snap fitting. Thus, the IC card reader 61 is mounted.

Further, electrical connection among the IC card reader 61, the numeric keypad device 101 and the controller 70 of the apparatus main assembly 3 is carried out in the following manner. That is, the USB plug 63 of the IC card reader 61 is connected to the USB port 114a of the USB connector 114 of the numeric keypad device 101. Further, the USB plug 112 of the numeric keypad device 101 is connected to an unshown USB port of the USB connector 39 of the apparatus main assembly 3. As a result, electrical connection among the IC card reader 61, the numeric keypad device 101 and the controller 70 of the apparatus main assembly 3 is established.

That is, as shown in FIG. 13, the IC card reader 61 is electrically connected between itself and the apparatus main assembly 3 through the numeric keypad device 101. As a result, IC card information processed by the IC card reader controller 93 of the IC card reader 61 is read by the CPU 81 of the apparatus main assembly 3 by USB communication through a USB device controller 94 and a hub controller 92 of the numeric keypad device 101. Here, the USB device controller 94 carries out device control of the USB communication in USB connection. The hub controller 92 provides a hub control function of the USB connection and is capable of extending the USB connection. Further, input information processed by a key controller 90 of the numeric keypad device 101 is read by the CPU 81 of the apparatus main assembly 3 by the USB communication through a USB device controller 91 and a USB hub controller 92.

Thus, according to a constitution of this embodiment, depending on the user's request, the numeric keypad device 101 and the IC card reader 61 can be additionally provided. Further, when both the numeric keypad device 101 and the IC card reader 61 are provided, the numeric keypad device 101 can be arranged immediately on the right side of the operating portion 11. Accordingly, operability of the numeric keypad device 101 can be improved. According to the present invention, in the image forming apparatus, it is possible to suppress a lowering in operability of the numeric keypads mounted as an option.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-018380 filed on Feb. 5, 2019, which is hereby incorporated by reference herein in its entirety.

What is claimed is:
1. An image forming apparatus comprising:
an operating portion of a touch panel type, the operation portion being capable of displaying a software key permitting input of a numerical value, the operation portion not being provided with a hardware key permitting input of the numerical value;
an input device that is a separate member from the operating portion as an option, the input device being provided adjacent to a right side of the operating portion when the image forming apparatus is seen from a position opposing the operating portion, the input device being provided with a hardware key permitting input of the numerical value, and the input device includes a USB hub controller and does not include a display;
an IC card reader that is a separate member from the operating portion and the input device, the IC card reader being provided adjacent to a right side of the input device when the image forming apparatus is seen from a position opposing the input device, the IC card reader being configured to receive user information from an IC card;

a holding member having a structure that is configured to integrally hold the input device and the IC card reader in a case in which the input device is provided as the option;

an image forming portion configured to form an image on a sheet, the image forming portion including at least one photosensitive drum and at least one developing device for developing a latent image formed on the photosensitive drum, an outer casing frame configured to accommodate the image forming portion therein, a control substrate accommodated inside the outer casing frame and configured to control the image forming portion based on inputted information by the operating portion, the input device, and the IC reader, a first cable provided on the input device and including a first USB plug, the first cable being configured to connect the control substrate and the input device and configured to transmit information from the input device to the control substrate via the first cable and the first USB plug, a second cable provided on the input device and including a USB port; and a third cable provided on IC card reader and including a second USB plug for connecting to the USB port, the third cable being configured to connect the input device and the IC card reader and configured to transmit information from the IC card reader to the USB hub controller of the input device via the second USB plug and the USB port, wherein information that is input to the IC card is transmitted to the USB hub controller of the input device and then is transmitted to the control substrate via the USB hub controller of the input device, and wherein the holding member integrally holds the input device and the IC card reader such that at least a part of the IC card reader projects beyond a right side wall of the outer casing frame when the image forming apparatus is seen from the position opposing the operating portion, and the holding member further holds the third cable.

2. An image forming apparatus according to claim 1, wherein the holding member includes a first holding portion configured to hold the input device and a second holding portion configured to hold the IC card reader, the first holding portion and the second holding portion being integrally molded with each other.

3. An image forming apparatus according to claim 1, wherein the holding member includes a first holding portion configured to hold the input device and a second holding portion configured to hold the IC card reader, the first holding portion and the second holding portion being fixed to each other with a screw.

* * * * *